United States Patent
Bethamsetty et al.

(10) Patent No.: US 12,541,417 B2
(45) Date of Patent: Feb. 3, 2026

(54) FAULT IDENTIFICATION AND PREVENTION USING TRAINED MACHINE LEARNING MODEL AND KNOWLEDGE GRAPH

(71) Applicant: T-Mobile USA, Inc., Bellevue, WA (US)

(72) Inventors: Sridhar Bethamsetty, Frisco, TX (US); Wei Huang, Bellevue, WA (US); Vikas Ranjan, Bellevue, WA (US); Diglio Antonio Simoni, Raleigh, NC (US)

(73) Assignee: T-Mobile USA, Inc., Bellevue, WA (US)

( * ) Notice: Subject to any disclaimer, the term of this patent is extended or adjusted under 35 U.S.C. 154(b) by 48 days.

(21) Appl. No.: 18/299,621

(22) Filed: Apr. 12, 2023

(65) Prior Publication Data

US 2024/0345913 A1    Oct. 17, 2024

(51) Int. Cl.
| G06F 11/00 | (2006.01) |
| G06F 11/07 | (2006.01) |
| H04L 41/16 | (2022.01) |
| H04W 24/04 | (2009.01) |

(52) U.S. Cl.
CPC ........ G06F 11/079 (2013.01); G06F 11/0709 (2013.01); G06F 11/0793 (2013.01); H04L 41/16 (2013.01); H04W 24/04 (2013.01)

(58) Field of Classification Search
CPC .............. G06F 11/079; G06F 11/0793; G06F 11/0709; G06F 11/3006; H04L 41/16; H04W 24/04
See application file for complete search history.

(56) References Cited

U.S. PATENT DOCUMENTS

| 8,190,723 B2 | 5/2012 | Datla et al. |
| 10,063,406 B2 | 8/2018 | Tapia et al. |
| 10,311,405 B2 | 6/2019 | Burton et al. |
| 10,373,094 B2 | 8/2019 | Naous et al. |
| 10,621,233 B2 | 4/2020 | Saxena et al. |
| 10,708,795 B2 | 7/2020 | Tapia |
| 10,726,025 B2 | 7/2020 | Guo et al. |
| 10,769,009 B2 | 9/2020 | Luo et al. |
| 10,805,809 B2 | 10/2020 | Veggalam et al. |
| 10,963,743 B2 | 3/2021 | Lecue et al. |

(Continued)

FOREIGN PATENT DOCUMENTS

| CA | 111930518 B | 1/2021 |
| CN | 110110093 A | 8/2019 |

(Continued)

Primary Examiner — Joseph D Manoskey
(74) Attorney, Agent, or Firm — Perkins Coie LLP

(57) ABSTRACT

Techniques related to identifying a component causing an issue in a wireless telecommunication network are disclosed. In one example aspect, a method for wireless communication includes creating a knowledge graph representing dependencies among components in the wireless telecommunication network. In response to obtaining an indication of the issue in the wireless telecommunication network, the indication of the issue and the knowledge graph are provided to a trained machine learning (ML) model, and the trained ML model indicates a particular component among the components in the wireless telecommunication network that is likely causing the issue.

19 Claims, 7 Drawing Sheets

(56) References Cited

U.S. PATENT DOCUMENTS

| | | | |
|---|---|---|---|
| 10,977,006 B2 | 4/2021 | Katzenberger et al. |
| 10,991,053 B2 | 4/2021 | Pingali et al. |
| 11,006,268 B1 | 5/2021 | Kim et al. |
| 11,070,441 B2 | 7/2021 | Di Pietro |
| 11,074,521 B2 | 7/2021 | Xie et al. |
| 11,271,796 B2 | 3/2022 | Tapia et al. |
| 11,271,797 B2 | 3/2022 | Yadav et al. |
| 11,294,784 B1 | 4/2022 | Bergman et al. |
| 11,308,211 B2 | 4/2022 | Ringlein et al. |
| 11,337,096 B2 | 5/2022 | Saluja et al. |
| 11,349,703 B2 | 5/2022 | Mercian et al. |
| 11,363,144 B2 | 6/2022 | Lau et al. |
| 11,366,812 B2 | 6/2022 | Carbune et al. |
| 11,399,295 B2 | 7/2022 | Osinski et al. |
| 11,481,603 B1 | 10/2022 | Newman |
| 11,490,432 B1 | 11/2022 | Menon et al. |
| 11,514,265 B2 | 11/2022 | Agrawal et al. |
| 11,526,388 B2 | 12/2022 | Prakash et al. |
| 11,526,751 B2 | 12/2022 | Singh et al. |
| 11,531,943 B1 | 12/2022 | Kumar |
| 11,537,134 B1 | 12/2022 | Wiest et al. |
| 11,551,106 B2 | 1/2023 | Maucec |
| 11,555,706 B1 | 1/2023 | Levihn et al. |
| 11,562,129 B2 | 1/2023 | Lin et al. |
| 11,617,093 B1 | 3/2023 | Artuso |
| 2017/0132513 A1 | 5/2017 | Yu et al. |
| 2018/0131810 A1 | 5/2018 | Yokel |
| 2019/0268721 A1 | 8/2019 | Tellado et al. |
| 2020/0076707 A1 | 3/2020 | Dukic et al. |
| 2020/0097601 A1 | 3/2020 | Han et al. |
| 2020/0272973 A1 | 8/2020 | Sun et al. |
| 2020/0293917 A1* | 9/2020 | Wang ............... G06N 20/00 |
| 2020/0333772 A1 | 10/2020 | Srivastava et al. |
| 2020/0334556 A1 | 10/2020 | Lele et al. |
| 2020/0394222 A1 | 12/2020 | Saxena et al. |
| 2020/0401910 A1 | 12/2020 | Hassanzadeh et al. |
| 2020/0401936 A1 | 12/2020 | Embarmannar Vijayan et al. |
| 2021/0012179 A1 | 1/2021 | Kalia et al. |
| 2021/0117815 A1 | 4/2021 | Creed et al. |
| 2021/0232913 A1 | 7/2021 | Martin et al. |
| 2021/0303381 A1* | 9/2021 | Baldassarre ......... G06F 11/079 |
| 2021/0304044 A1 | 9/2021 | Nagarajan et al. |
| 2021/0399972 A1* | 12/2021 | Nguyen ............. G06F 11/2252 |
| 2021/0406779 A1 | 12/2021 | Hu et al. |
| 2022/0019495 A1 | 1/2022 | Lavi et al. |
| 2022/0027331 A1 | 1/2022 | Hwang et al. |
| 2022/0036175 A1 | 2/2022 | Krishnamurthy et al. |
| 2022/0107858 A1 | 4/2022 | Jain et al. |
| 2022/0109615 A1 | 4/2022 | Roy et al. |
| 2022/0122731 A1 | 4/2022 | Chen et al. |
| 2022/0129803 A1 | 4/2022 | Bikumala et al. |
| 2022/0150221 A1 | 5/2022 | Fiumara et al. |
| 2022/0172111 A1 | 6/2022 | Gao et al. |
| 2022/0237441 A1 | 7/2022 | Soler Garrido et al. |
| 2022/0261817 A1 | 8/2022 | Ferrucci et al. |
| 2022/0269936 A1 | 8/2022 | Zhu et al. |
| 2022/0284311 A1 | 9/2022 | Haynes et al. |
| 2022/0300854 A1 | 9/2022 | Guan et al. |
| 2022/0343181 A1 | 10/2022 | Thomas |
| 2022/0343329 A1 | 10/2022 | Wang |
| 2022/0383118 A1 | 12/2022 | Nair et al. |
| 2022/0394049 A1 | 12/2022 | Abrahamian et al. |
| 2023/0004941 A1 | 1/2023 | Yerastov et al. |
| 2023/0022222 A1 | 1/2023 | Files et al. |
| 2023/0034559 A1 | 2/2023 | Fu et al. |
| 2023/0050889 A1 | 2/2023 | Kumar Jaya Kumar et al. |
| 2023/0067997 A1 | 3/2023 | Afrasiabi |
| 2023/0085786 A1 | 3/2023 | St. Bernard et al. |
| 2023/0104655 A1 | 4/2023 | Amarasingham et al. |
| 2023/0105304 A1 | 4/2023 | Mandal et al. |
| 2024/0104480 A1* | 3/2024 | Chevuru ......... G06Q 10/06393 |

FOREIGN PATENT DOCUMENTS

| | | |
|---|---|---|
| CN | 113095592 A | 7/2021 |
| CN | 112732450 B | 7/2022 |
| EP | 3353656 B1 | 5/2020 |
| EP | 3837660 A1 | 6/2021 |
| EP | 3849154 A1 | 7/2021 |
| EP | 3859745 A1 | 8/2021 |
| WO | 2020132137 A1 | 6/2020 |
| WO | 2021197602 A1 | 10/2021 |
| WO | 2022005913 A1 | 1/2022 |
| WO | 2022258846 A1 | 12/2022 |
| WO | 2022263802 A1 | 12/2022 |

* cited by examiner

| Legend |
|---|
| API ☑ |
| DBServer ☑ |
| Developer ☐ |
| EndUser ☑ |
| File ☐ |
| Job ☑ |
| ProgLanguage ☐ |
| Report ☑ |
| Service ☐ |
| Storage ☑ |
| StoredProcedure ☑ |
| Sub Process ☑ |
| System ☐ |
| Table ☑ |
| VersionControl ☑ |
| WebUI ☑ |

*FIG. 6*

FAULT IDENTIFICATION AND PREVENTION USING TRAINED MACHINE LEARNING MODEL AND KNOWLEDGE GRAPH

BACKGROUND

A knowledge graph is a knowledge base that uses a graph-structured data model or topology to integrate data. Knowledge graphs are often used to store interlinked descriptions of entities—objects, events, situations, or abstract concepts—while also encoding the semantics underlying the used terminology. Knowledge graphs are often associated with linked open data projects, focusing on the connections between concepts and entities.

BRIEF DESCRIPTION OF THE DRAWINGS

Detailed descriptions of implementations of the present invention will be described and explained through the use of the accompanying drawings.

FIG. 6 is a diagram that illustrates a legend of a knowledge graph in which at least some operations described herein can be implemented.

Figure 1:
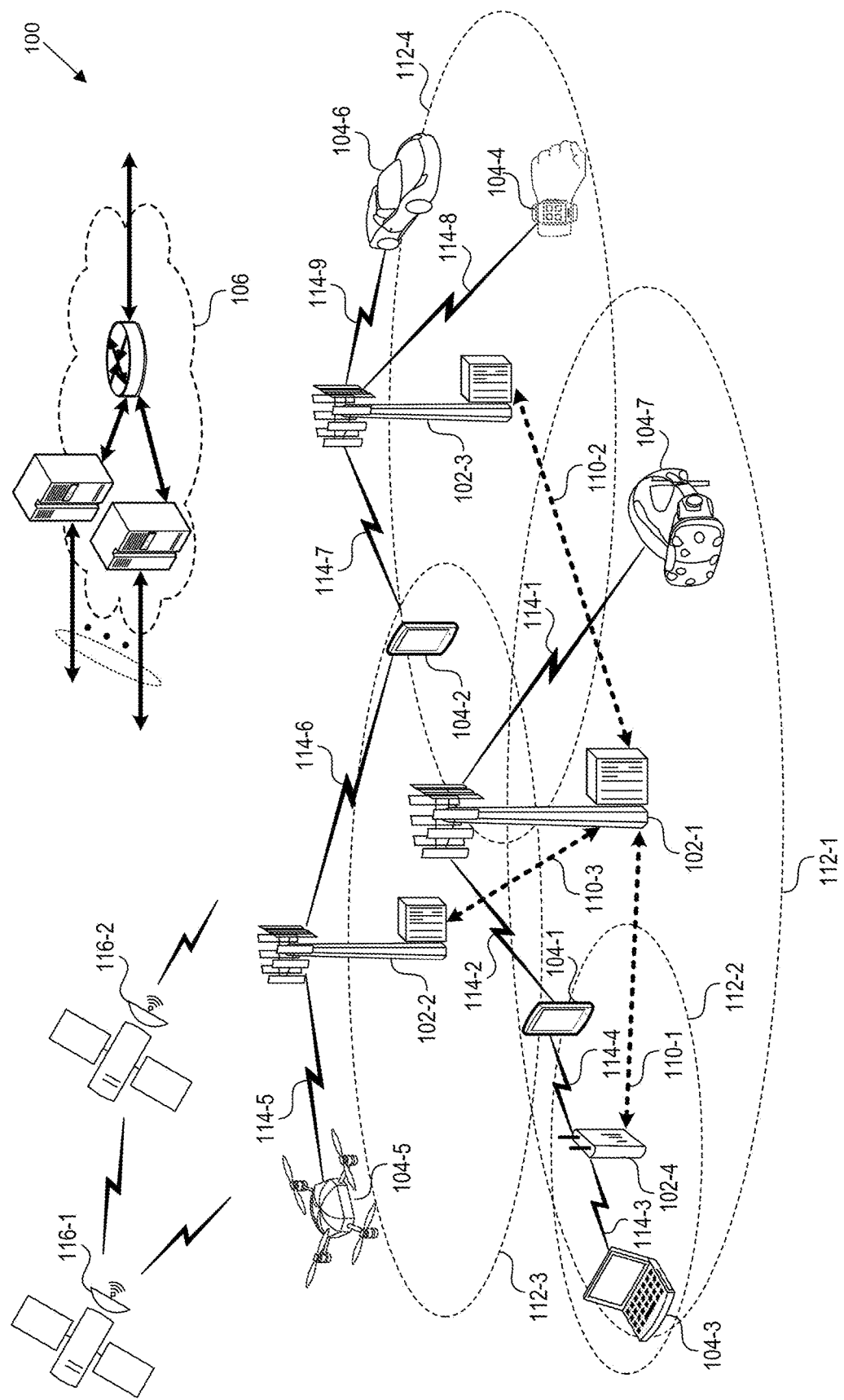
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Wireless telecommunication networks today face challenges due to lack of visibility in operations. Common operational challenges include delays in identifying a fault or an issue in the network, failure to identify a root cause of the issue due to missing data lineage, and lack of visibility in flow of data in the network.

The disclosed technologies address common operational challenges faced by wireless telecommunication networks by training a machine learning (ML) model to identify a component causing an issue in the wireless telecommunication network and prevent the issue from affecting the network. A history of issues in the network as well as synthetically generated issues are used as training data to train the ML model. Error reports are generated in response to the issues. A knowledge graph that represents dependencies of all components and/or applications related to a process in the network is implemented. In response to obtaining an indication of an issue in the network, the ML model uses the error reports of issues and the knowledge graph to identify a particular component in the process that is causing the issue. The ML model is further trained to prevent future faults that are similar to the issues identified in the error reports.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNBs is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

5G Core Network Functions

Figure 2:
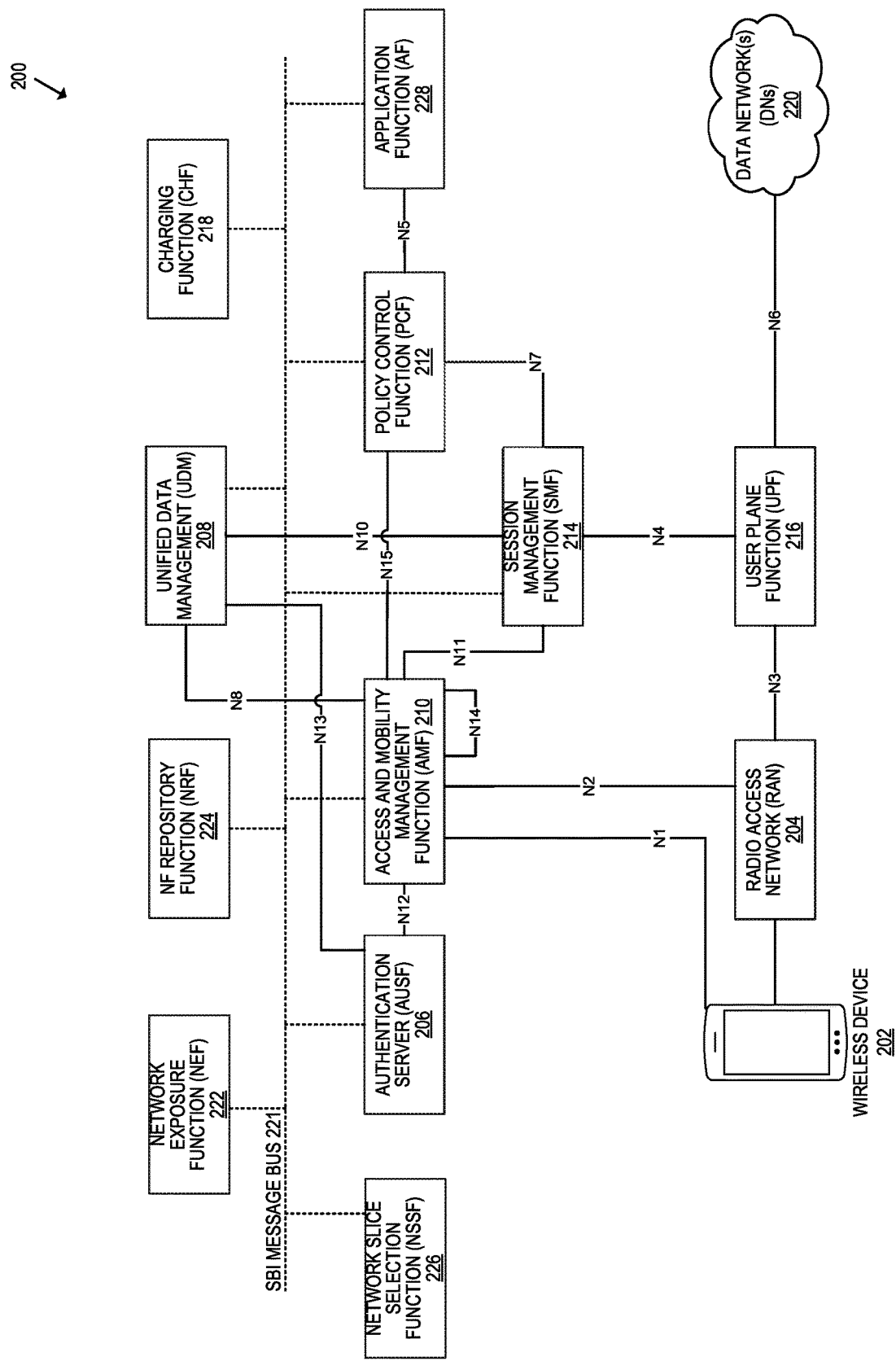
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), serving to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214, assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes network slice selection, which is regulated by the NSSF 226.

Figure 3:
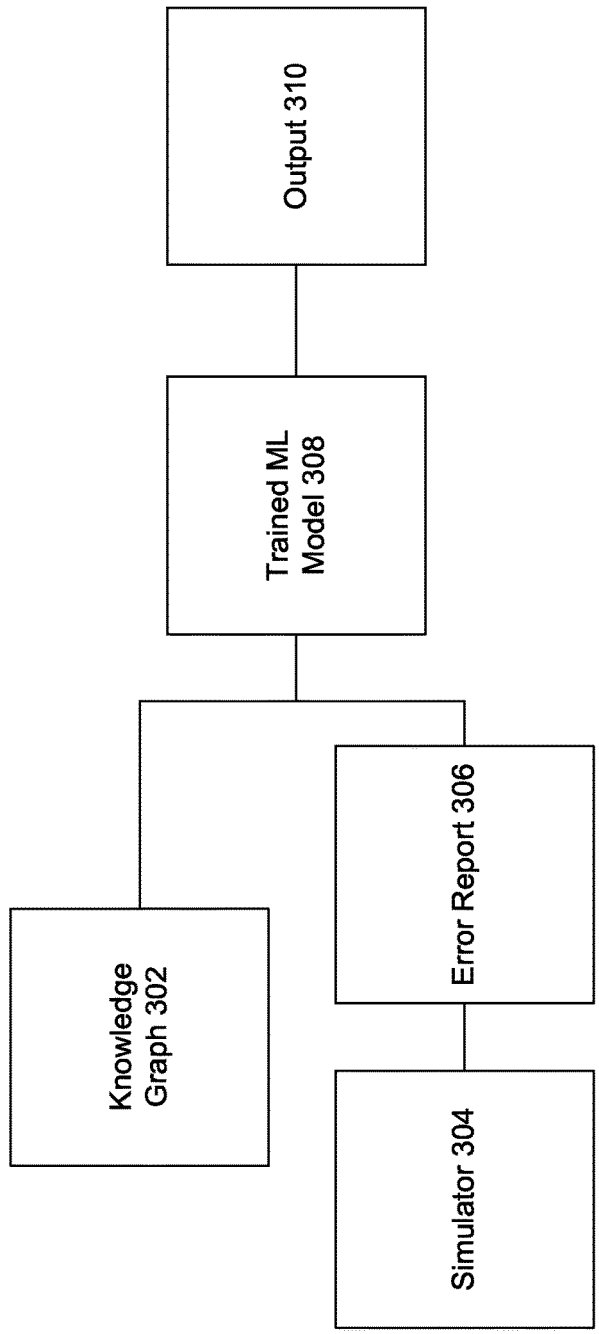
FIG. 3 is a block diagram that illustrates an overview of a system generating an output based on a knowledge graph and an error report in response to identifying an issue.

Fault Identification and Prevention Using Trained Machine Learning Model and Knowledge Graph FIG. 3 is a block diagram that illustrates an overview of a system 300 generating an output based on a knowledge graph and an error report in response to identifying an issue. The knowledge graph 302 provides a holistic view of all components and/or applications related to a process in the system 300. The knowledge graph 302 is configured to contain information of the related components as well as the relationships among the applications. In some implementations, the knowledge graph 302 can be updated in real time to specify new components, new relationships between components, and new properties associated with the components or relationships. Because the knowledge graph 302 provides a view of all components associated with a process, a user or a process analyzing the knowledge graph 302 is able to understand the flow of data as well as analyze an impact of a component on other components and the process as a whole.

In some implementations, the user or the process analyzing the knowledge graph 302 is able to further explore the components and the interrelationships of the components through a combination of a text-based search and direct graph visualization using expansion and collapse mechanisms. For example, by selecting a component of interest in the knowledge graph 302, the user or the process analyzing the knowledge graph 302 is able to expand the knowledge graph 302 to view all components associated with the selected component.

The system 300 configures a simulator 304 to generate synthetic issues and inject those synthetic issues into a process. The purpose of injecting synthetic issues is to observe how the synthetic issues affect the process and analyze methods to prevent similar issues in the future. In response to each synthetic issue, the simulator 304 generates an error report 306. The error report 306 identifies components that are affected by the synthetic issue and are causing the error in the process.

The system 300 uses a trained machine learning (ML) model 308 to identify components that are likely causing the identified issue. A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes clustering, reinforcement learning, probability distributions, decision trees, decision tree forests, and others. Models can be configured for various situations, data types, sources, and output formats.

In some implementations, a model used by the system 300 can be a neural network with multiple input nodes that receive error reports as inputs. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer (the "output layer"), one or more nodes can produce a value classifying the input that, once the model is trained, can be used to identify components that are likely causing the identified issue. In some implementations, such neural networks, known as deep neural networks, can have multiple layers of intermediate nodes with different configurations, can be a combination of models that receive different parts of the input and/or input from other parts of the deep neural network, or can be convolutions—partially using output from previous iterations of applying the model as further input to produce results for the current input.

One or more of the ML models described herein can be trained with supervised learning, where the training data includes the error reports generated from synthetic issues as input and an output 310, such as a prediction of an occurrence of an issue and identification of components causing the issue. The output 310 from the model can be compared to a desired output, and based on the comparison, the model can be modified, such as by changing weights between nodes of the neural network or parameters of the functions used at each node in the neural network (e.g., applying a loss function). After applying each of the error reports from synthetic issues in the training data and modifying the model in this manner, the model can be trained to evaluate new sets of issues.

Figure 4:
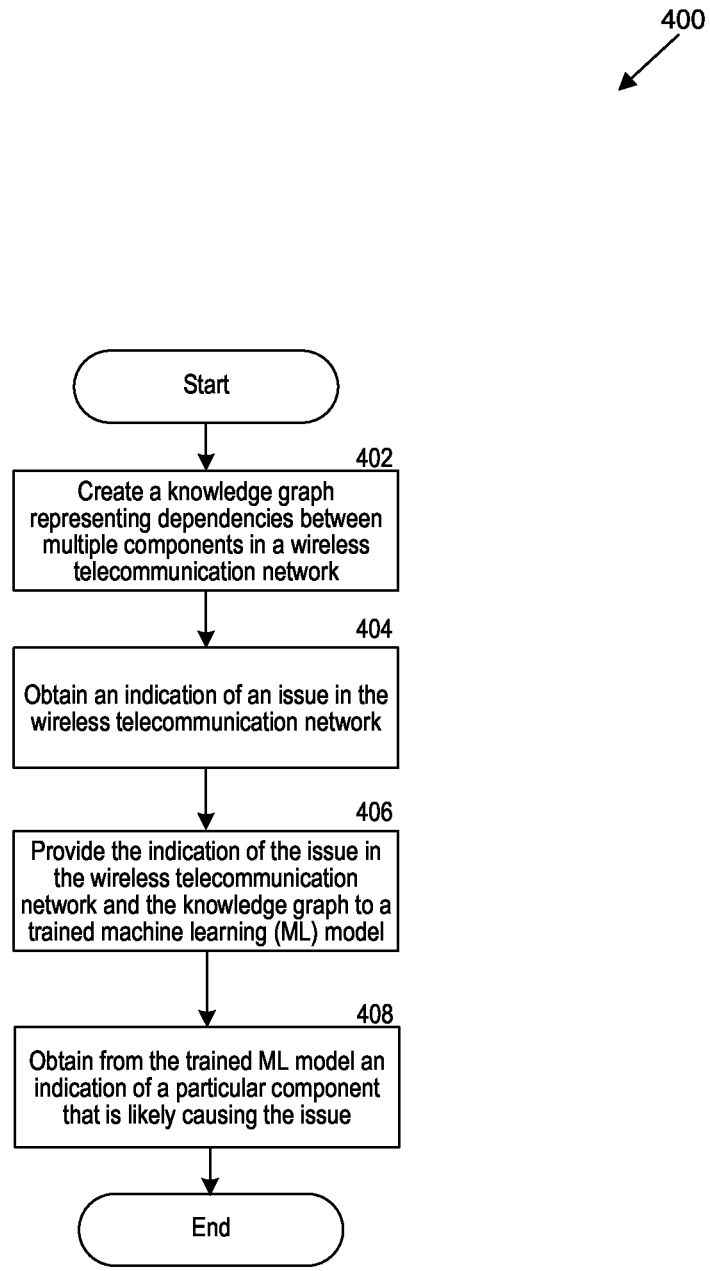
FIG. 4 is a flowchart representation of a system that uses a trained machine learning (ML) model to identify a component that is causing an issue in a wireless telecommunication network.

FIG. 4 is a flowchart representation of a system that uses a trained ML model to identify a component that is causing an issue in a wireless telecommunication network. At 402, the system creates a knowledge graph representing dependencies between multiple components of a process in a wireless telecommunication network. Each node in the knowledge graph represents a component of the process in the wireless telecommunication network. The components can include an application programming interface (API), a database, a developer, an end user, a file, a job, a programming language, a report, service, storage, a stored procedure, a sub-process, or a system. Within the knowledge graph, nodes are connected with each other using edges that represent the flow of data among the nodes. In some implementations, the components can represent power supply, cooling system, and servers of the wireless telecommunication network.

In some implementations, the edges are labeled according to the data that is being shared between the nodes. For example, an edge labeled "tables" that connects a database node and a developer node indicates that the developer node receives data in a form of tables from the database node. In other implementations, the edges are labeled according to a task that is being performed by one node using the other node. For example, an edge labeled "read" that connects a team node to a storage node indicates that a team member reads data stored in the storage node.

In some implementations, each node includes an indication of a number of nodes represented by the node in the knowledge graph. When the node is selected, the knowledge graph is expanded to display the nodes represented by the node in the knowledge graph.

At 404, the system obtains an indication of an issue in the wireless telecommunication network. The issue can be a naturally occurring issue in the wireless telecommunication network or a synthetically generated fault introduced to simulate how the wireless telecommunication network responds to the fault.

In some implementations, the system generates a synthetic issue associated with a specific component of a process in the wireless telecommunication network. The synthetic issue is an issue that stops the process or delays the process. After generating the synthetic issue, the system determines a subset of components affected by the synthetic issue. Based on the affected subset of components, the system determines an importance of the component associated with the synthetic issue. If there are multiple components associated with the synthetic issue, the system can generate a report ranking the components by importance based on the associations with the subset of affected components. In some implementations, based on the importance of the component(s), the system generates a suggestion to ensure reliability of the component(s). For example, the system can create a duplicate data, allocate more reliable hardware to run the affected component, and simulate a duplicate process to determine that the component is no longer affected by the synthetic issue.

At 406, the system provides the indication of the issue in the wireless telecommunication network and the knowledge graph to a trained ML model. In some implementations, prior to receiving the indication of the issue and the knowledge graph, the system trains the ML model with training data. Training data includes a history of multiple naturally occurring issues associated with the wireless telecommunication network. Training data also includes multiple synthetic issues generated based on the history of multiple naturally occurring issues associated with the wireless telecommunication network. The system trains the ML model with the training data to avoid generating similar issues in the wireless telecommunication network.

In some implementations, based on the training data, the ML model is able to pinpoint a likely component in the knowledge graph that is causing an error resulting in the issue. The ML model is also able to identify relationships between the component causing the error and other components of the knowledge graph.

At 408, the system receives from the trained ML model an indication of a particular component that is likely causing the issue. In some embodiments, the trained ML model provides a solution to the issue based on the history of substantially similar issues, such as updating hardware to run the particular component or removing the component upon deciding that the particular component is not connected with other components of the process in the knowledge graph.

In some implementations, the system trains the ML model by providing an indication of an issue in the wireless telecommunication network as training data. When the system obtains a subsequent indication of a substantially similar issue, the trained ML model predicts an occurrence of the substantially similar issue. In other implementations, in response to obtaining the subsequent indication of the substantially similar issue, the trained ML model retrieves a solution to the issue and prevents the substantially similar issue from affecting the wireless telecommunication network.

Figure 5:
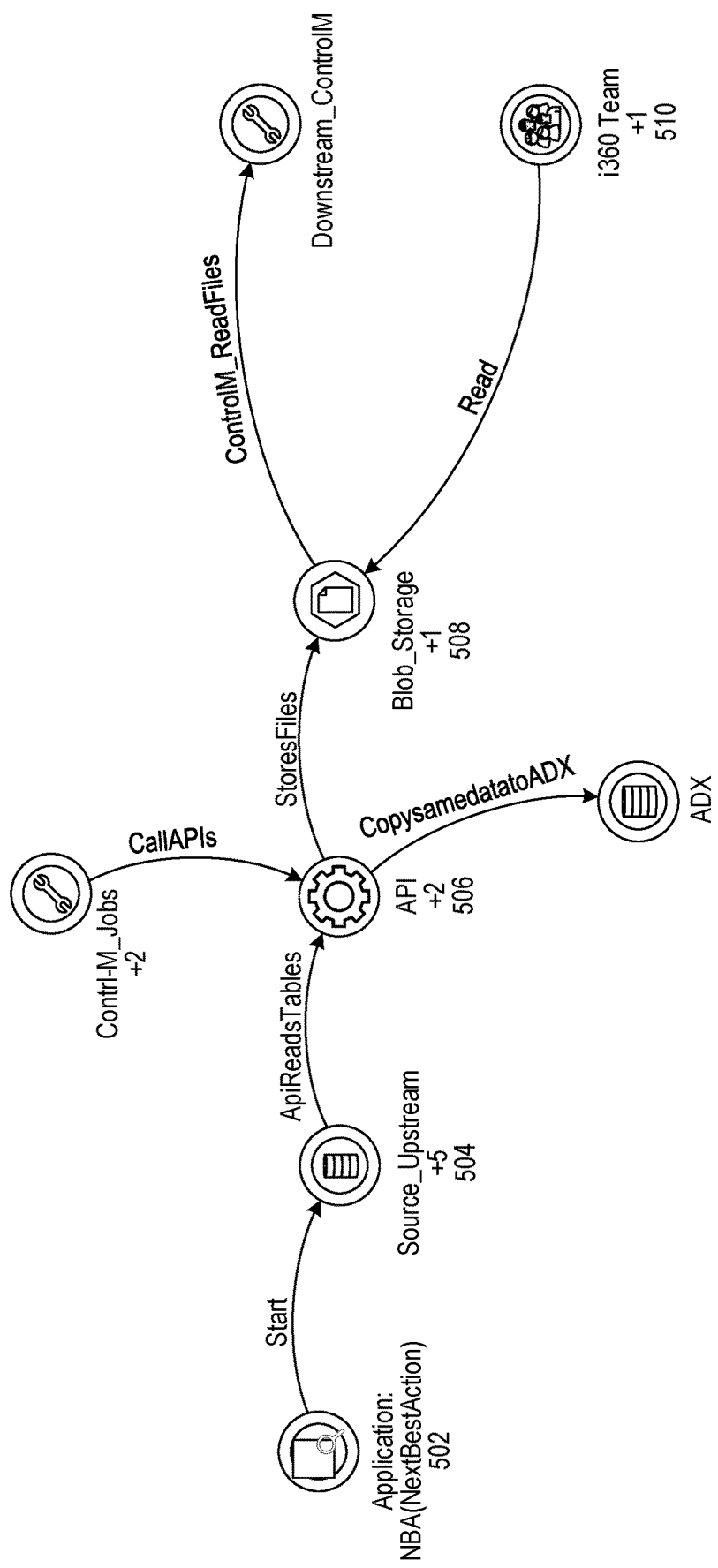
FIG. 5 is a diagram that illustrates an example of a knowledge graph in which at least some operations described herein can be implemented.

FIG. 5 is a diagram that illustrates an example of a knowledge graph in which at least some operations described herein can be implemented. As discussed in connection with FIG. 4, the knowledge graph represents dependencies between multiple components of a process or an application in a wireless telecommunication network. Each node in the knowledge graph represents a component of the process in the wireless telecommunication network. The components can include an API, a database, a developer, an end user, a file, a job, a programming language, a report, service, storage, a stored procedure, a sub-process, or a system. Within the knowledge graph, nodes are connected with each other using edges that represent the flow of data between the nodes.

The knowledge graph in FIG. 5 shows a high-level view of an application called NextBestAction and a flow of data among related components. The process begins with the application signaling a source system to start the process. This is represented in the knowledge graph with an edge labeled "start" connecting the application node 502 to the source system node 504. Consequently, the API takes data from the source system, processes the data, and stores the data into a disk storage. This is represented in the knowledge graph with the API node 506 and edges connecting the API node 506 with the source system node 504 and the disk storage node 508. Members of the i360 team are able to read the data stored in the disk storage, and this is represented with an edge labeled "read" connecting the i360 team node 510 and the disk storage node 508.

As shown in FIG. 5, each node includes an indication of a number of hidden nodes represented by the node in the knowledge graph. For example, the number 2 below the API node 506 indicates that there are two additional related nodes that are hidden from the high-level view of the NextBestAction application. Upon selecting the API node 506, the knowledge graph can expand to display all nodes related to the API node 506.

The knowledge graph can be voluminous and difficult to examine. To efficiently find a particular portion of the graph, the system enables a search of the knowledge graph. The search can be based on the user name, node name, component type, process name, application name, etc. As discussed in connection with FIG. 4, in some implementations, the system receives a request to search for a node associated with an issue in the wireless telecommunication network. The request can be made by a user through a search bar or a selection of the node in the knowledge graph. In response to receiving the request, the system identifies the node associated with the issue in the knowledge graph. The system also displays all nodes connected to the identified node, where the nodes are connected with edges representing the flow of data between the nodes.

In other implementations, the system receives a request to search a process in the wireless telecommunication network. The request can be made by a user through a search bar or a selection of the process in a list of processes in the wireless telecommunication network. In response to receiving the request, the system displays all nodes associated with the process in the knowledge graph, with the nodes connected with edges representing the flow of data between the nodes in the process.

FIG. 6 is a diagram that illustrates a legend of a knowledge graph according to some implementations. As discussed in connection with FIG. 3, each node in the knowledge graph represents a component of a process in a wireless telecommunication network. The components include an API 602, a database server 604, a developer 606, an end user 608, a file 610, a job 612, a programming language 614, a report 616, service 618, storage 620, a stored procedure 622, a sub-process 624, a system 626, or a table 628. Using the legend, a user or a process analyzing the knowledge graph is able to display or hide various components to understand the flow of data among components. For example, to gain an understanding of how an end user receives data from a database server, the user or the process analyzing the knowledge graph can select boxes 630 corresponding with the end user 608, storage 620, database server 604, file 610, and table 628 in the legend. Upon determining that tables do not help the user understand the data flow, the user can deselect the box corresponding with the table to hide components related to tables in the knowledge graph.

In another example, the user or the process analyzing the knowledge graph can select boxes 630 corresponding with the API 602, database server 604, programming language 614, and system 626 to gain insight on how the API 602 handles a process. The knowledge graph displays the selected components, and the user or the process analyzing the knowledge graph is able to understand how the API 602 reads data from the database server 604 in the system 626. Upon determining that several jobs are associated with the API 602 that give insight into the handling of the process, the user or the process analyzing the knowledge graph selects a box 630 corresponding with the job 612, after which the knowledge graph displays the jobs 612 associated with the API 602.

In some implementations, the legend displays the components in a predefined manner. The components can be displayed in an order of frequency as the components appear on knowledge graphs. The components can also be displayed in alphabetical order.

Computer System

Figure 7:
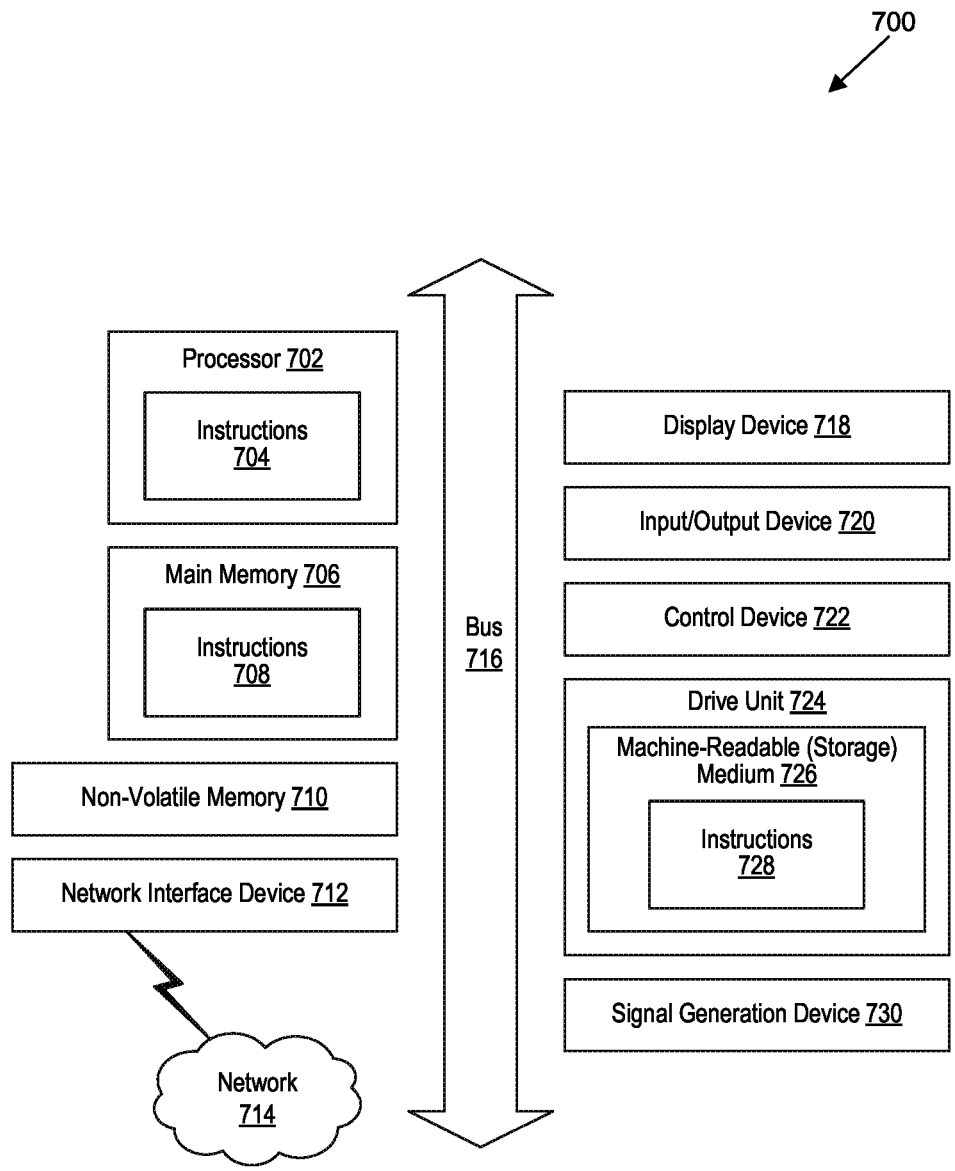
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementations, the computer system 700 can be an embedded computer system, a system-on-chip (SOC), a single-board computer system (SBC), or a distributed system such as a mesh of computer systems, or can include one or more cloud components in one or more networks. Where appropriate, one or more computer systems 700 can perform operations in real time, in near real time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one non-transitory computer-readable storage medium storing instructions, which, when executed by at least one data processor of a system, cause the system to:
   create a knowledge graph representing dependencies between multiple components of the wireless telecommunication network,
      wherein a node in the knowledge graph represents a component among the multiple components of the wireless telecommunication network,
      wherein the component includes at least four of: an API, a database, a developer, an end user, a file, a job, a programming language, a report, service, storage, a stored procedure, a sub-process, or a system, and
      wherein an edge in the knowledge graph represents a flow of data between two nodes among the multiple nodes;
   obtain a history of multiple issues associated with the wireless telecommunication network,
      wherein the history of multiple issues includes stopping a process or delaying the process from generating data;
   based on the history of multiple issues, generate multiple synthetic issues associated with the wireless telecommunication network;
   configure a simulator to inject the multiple synthetic issues into the process, wherein the multiple synthetic issues comprise synthetically generated faults introduced to simulate a response of the wireless telecommunication network to the synthetically generated faults;
   inject the multiple synthetic issues into the process;
   determine components affected by the multiple injected synthetic issues;
   generate an error report that identifies the components that are affected by the multiple injected synthetic issues;
   train a machine learning (ML) model by providing the error report as training data, wherein the ML model is trained to prevent future faults similar to the multiple synthetic issues by identifying components that are likely causing the multiple synthetic issues thereby avoiding generating issues in the wireless telecommunication network;
   obtain an indication of an issue in the wireless telecommunication network;
   provide the indication of the issue in the wireless telecommunication network and the knowledge graph to the trained ML model;
   obtain from the ML model an indication of a particular component among the multiple components that is likely causing the issue;
   generate, using the ML model, a suggestion to remove the particular component from the wireless telecommunication network, wherein the ML model is trained using the error report based on the multiple injected synthetic issues; and
   remove the particular component from the wireless telecommunication network based on the suggestion.

2. The at least one non-transitory computer-readable storage medium of claim 1, comprising instructions to:
   generate a synthetic issue associated with the component among the multiple components of the wireless telecommunication network;
   determine a subset of the multiple components of the wireless telecommunication network affected by the synthetic issue;

based on the subset of the multiple components of the wireless telecommunication network affected by the synthetic issue, determine an importance of the component; and based on the importance of the component, generate a suggestion to ensure reliability of the component.

3. The at least one non-transitory computer-readable storage medium of claim 1, comprising instructions to:

generate a synthetic issue associated with the component among the multiple components of the wireless telecommunication network;

determine a subset of the multiple components of the wireless telecommunication network affected by the synthetic issue; and based on the subset of the multiple components of the wireless telecommunication network affected by the synthetic issue, determine an importance of the component.

4. The at least one non-transitory computer-readable storage medium of claim 1, comprising instructions to:

receive a request to search for a node associated with the issue in the wireless telecommunication network;

identify the node associated with the issue in the wireless telecommunication network; and in response to identifying the node in the knowledge graph, display all nodes connected to the node, wherein the nodes are connected with edges representing the flow of data between the nodes.

5. The at least one non-transitory computer-readable storage medium of claim 1, comprising instructions to:

train the ML model by providing a first indication of the issue in the wireless telecommunication network as training data;

obtain a second indication of a substantially similar issue; and through the trained ML model, predict an occurrence of the substantially similar issue in response to obtaining the second indication of the substantially similar issue.

6. The at least one non-transitory computer-readable storage medium of claim 1, comprising instructions to:

train the ML model by providing a first indication of the issue in the wireless telecommunication network as training data;

obtain a second indication of a genesis of a substantially similar issue;

retrieve a solution to the issue; and based on the solution to the issue, prevent the substantially similar issue from affecting the wireless telecommunication network.

7. The at least one non-transitory computer-readable storage medium of claim 1, comprising instructions to:

provide an indication of a number of nodes represented by a node in the knowledge graph;

receive a selection of the node in the knowledge graph; and in response to receiving the selection, expand the knowledge graph to display multiple nodes represented by the node in the knowledge graph.

8. A system comprising:

at least one hardware processor; and at least one non-transitory memory storing instructions, which, when executed by the at least one hardware processor, cause the system to:

create a knowledge graph representing dependencies between multiple components of a wireless telecommunication network, wherein a node in the knowledge graph represents a component among the multiple components of the wireless telecommunication network, and wherein an edge in the knowledge graph represents a flow of data between two nodes among the multiple nodes;

obtain a history of multiple issues associated with the wireless telecommunication network, wherein the history of multiple issues includes stopping a process or delaying the process from generating data;

based on the history of multiple issues, generate multiple synthetic issues associated with the wireless telecommunication network;

configure a simulator to inject the multiple synthetic issues into the process, wherein the multiple synthetic issues comprise synthetically generated faults introduced to simulate a response of the wireless telecommunication network to the synthetically generated faults;

inject the multiple synthetic issues into the process;

determine components affected by the multiple injected synthetic issues;

generate an error report that identifies the components that are affected by the multiple injected synthetic issues;

train a machine learning (ML) model by providing the error report as training data, wherein the ML model is trained to prevent future faults similar to the multiple synthetic issues by identifying components that are likely causing the multiple synthetic issues thereby avoiding generating issues in the wireless telecommunication network;

obtain an indication of an issue in the wireless telecommunication network;

provide the indication of the issue in the wireless telecommunication network and the knowledge graph to the trained ML model;

obtain from the ML model an indication of a particular component among the multiple components that is likely causing the issue;

generate, using the ML model, a suggestion to remove the particular component from the wireless telecommunication network, wherein the ML model is trained using the error report based on the multiple injected synthetic issues; and remove the particular component from the wireless telecommunication network based on the suggestion.

9. The system of claim 8, wherein the multiple components include power supply, cooling system, and servers of the wireless telecommunication network.

10. The system of claim 8, where the system is further instructed to:

generate a synthetic issue associated with the component among the multiple components of the wireless telecommunication network;

determine a subset of the multiple components of the wireless telecommunication network affected by the synthetic issue;

based on the subset of the multiple components of the wireless telecommunication network affected by the synthetic issue, determine an importance of the component; and based on the importance of the component, generate a suggestion to ensure reliability of the component.

11. The system of claim 8, where the system is further instructed to:
   generate a synthetic issue associated with the component among the multiple components of the wireless telecommunication network;
   determine a subset of the multiple components of the wireless telecommunication network affected by the synthetic issue; and
   based on the subset of the multiple components of the wireless telecommunication network affected by the synthetic issue, determine an importance of the component.

12. The system of claim 8, where the system is further instructed to:
   receive a request to search for a node associated with the issue in the wireless telecommunication network;
   identify the node associated with the issue in the wireless telecommunication network; and
   in response to identifying the node in the knowledge graph, display all nodes connected to the node,
      wherein the nodes are connected with edges representing the flow of data between the nodes.

13. The system of claim 8, where the system is further instructed to:
   train the ML model by providing a first indication of the issue in the wireless telecommunication network as training data;
   obtain a second indication of a substantially similar issue; and
   through the trained ML model, predict an occurrence of the substantially similar issue in response to obtaining the second indication of the substantially similar issue.

14. The system of claim 8, where the system is further instructed to:
   train the ML model by providing a first indication of the issue in the wireless telecommunication network as training data;
   obtain a second indication of a genesis of a substantially similar issue;
   retrieve a solution to the issue; and
   based on the solution to the issue, prevent the substantially similar issue from affecting the wireless telecommunication network.

15. The system of claim 8, where the system is further instructed to:
   provide an indication of a number of nodes represented by a node in the knowledge graph;
   receive a selection of the node in the knowledge graph; and
   in response to receiving the selection, expand the knowledge graph to display multiple nodes represented by the node in the knowledge graph.

16. A method comprising:
   creating a knowledge graph representing dependencies between multiple components of a wireless telecommunication network,
      wherein a node in the knowledge graph represents a component among the multiple components of the wireless telecommunication network,
      wherein the component includes at least four of: an API, a database, a developer, an end user, a file, a job, a programming language, a report, service, storage, a stored procedure, a sub-process, or a system, and
      wherein an edge in the knowledge graph represents a flow of data between two nodes among the multiple nodes;
   obtaining a history of multiple issues associated with the wireless telecommunication network,
      wherein the history of multiple issues includes stopping a process or delaying the process from generating data;
   based on the history of multiple issues, generating multiple synthetic issues associated with the wireless telecommunication network;
   configuring a simulator to inject the multiple synthetic issues into the process, wherein the multiple synthetic issues comprise synthetically generated faults introduced to simulate a response of the wireless telecommunication network to the synthetically generated faults;
   injecting the multiple synthetic issues into the process;
   determining components affected by the multiple injected synthetic issues;
   generating an error report that identifies components that are affected by the multiple injected synthetic issues;
   training a machine learning (ML) model by providing the error report as training data, wherein the ML model is trained to prevent future faults similar to the multiple synthetic issues by identifying components that are likely causing the multiple synthetic issues thereby avoiding generating issues in the wireless telecommunication network;
   obtaining an indication of an issue in the wireless telecommunication network;
   providing the indication of the issue in the wireless telecommunication network and the knowledge graph to the trained ML model;
   obtaining from the ML model an indication of a particular component among the multiple components that is likely causing the issue;
   generating, using the ML model, a suggestion to remove the particular component from the wireless telecommunication network, wherein the ML model is trained using the error report based on the multiple injected synthetic issues; and
   removing the particular component from the wireless telecommunication network based on the suggestion.

17. The method of claim 16, further comprising:
   generating a synthetic issue associated with the component among the multiple components of the wireless telecommunication network;
   determining a subset of the multiple components of the wireless telecommunication network affected by the synthetic issue; and
   based on the subset of the multiple components of the wireless telecommunication network affected by the synthetic issue, determining an importance of the component.

18. The method of claim 16, further comprising:
   training the ML model by providing a first indication of the issue in the wireless telecommunication network as training data;
   obtaining a second indication of a substantially similar issue; and
   through the trained ML model, predicting an occurrence of the substantially similar issue in response to obtaining the second indication of the substantially similar issue.

19. The method of claim 16, wherein the ML model is a neural network comprising multiple layers including an input layer, one or more intermediate layers, and an output layer, and wherein the input layer is configured to receive the error report as training data, the one or more intermediate layers are configured to produce predictions of the components based on the error report and predictions from lower layers, and the output layer is configured to produce a value classifying the error report to identify components that are likely causing the multiple synthetic issues.

* * * * *